United States Patent [19]
Bongart et al.

[11] Patent Number: 5,168,890
[45] Date of Patent: Dec. 8, 1992

[54] METHOD AND DEVICE FOR FITTING A ROTARY THROTTLE UNIT IN A PIPE

[75] Inventors: Marcel Bongart, Aviron; Gérard Lecoeur, Evreux, both of France

[73] Assignee: Solex, France

[21] Appl. No.: 673,893

[22] Filed: Mar. 25, 1991

[30] Foreign Application Priority Data

Mar. 23, 1990 [FR] France ............... 90 03757

[51] Int. Cl.$^5$ ............... F16K 51/00; B21D 53/00
[52] U.S. Cl. ............... 137/15; 137/315; 29/407; 29/888.46; 29/890.124; 251/308
[58] Field of Search ............... 137/15, 315; 251/305, 251/308; 29/213.1, 244, 249, 407, 888.46, 890.124

[56] References Cited

U.S. PATENT DOCUMENTS

| | | | |
|---|---|---|---|
| 1,841,695 | 1/1932 | Anderson | 251/308 |
| 1,857,477 | 5/1932 | Ritter | 251/308 |
| 3,120,053 | 2/1964 | Lewis | 29/213.1 |
| 3,862,740 | 1/1975 | Gallagher et al. | 251/305 |
| 4,420,438 | 12/1983 | Goosen | 251/305 |
| 4,561,158 | 12/1985 | Johnson et al. | 29/888.46 |
| 4,938,452 | 7/1990 | Imamura et al. | 251/305 |
| 4,996,769 | 3/1990 | Bongart | 29/888.46 |

FOREIGN PATENT DOCUMENTS 2642498 8/1990 France .
55-aa755(A) 1/1980 Japan .

Primary Examiner—George L. Walton
Attorney, Agent, or Firm—Larson and Taylor

[57] ABSTRACT

A method and device are disclosed for fitting a shaft-butterfly valve unit in a pipe formed by a butterfly valve body. The device comprises a frame receiving the pipe with its unit. It also comprises a first thruster for moving the shaft in a first direction as far as the first abutment position and a second thruster for moving the shaft in the opposite direction as far as the second abutment position. A sensor detects the abutment positions, and the gap (j) between the abutment positions is computed. The first or second motor is controlled for moving the shaft from the first or second abutment position by a distance equal to a predetermined fraction of the gap.

9 Claims, 2 Drawing Sheets

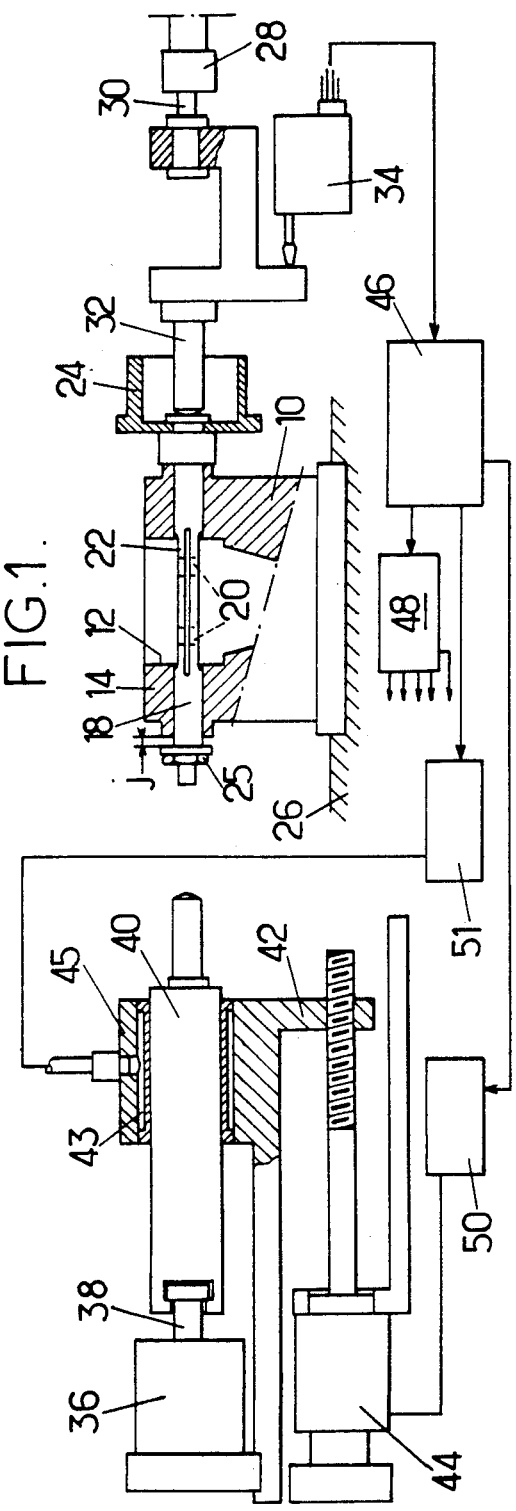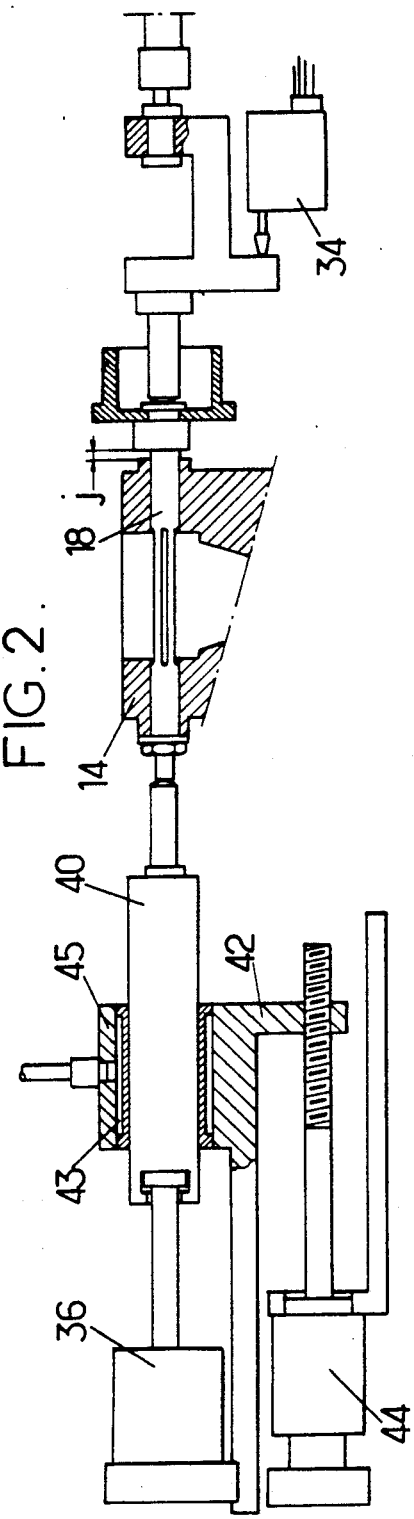

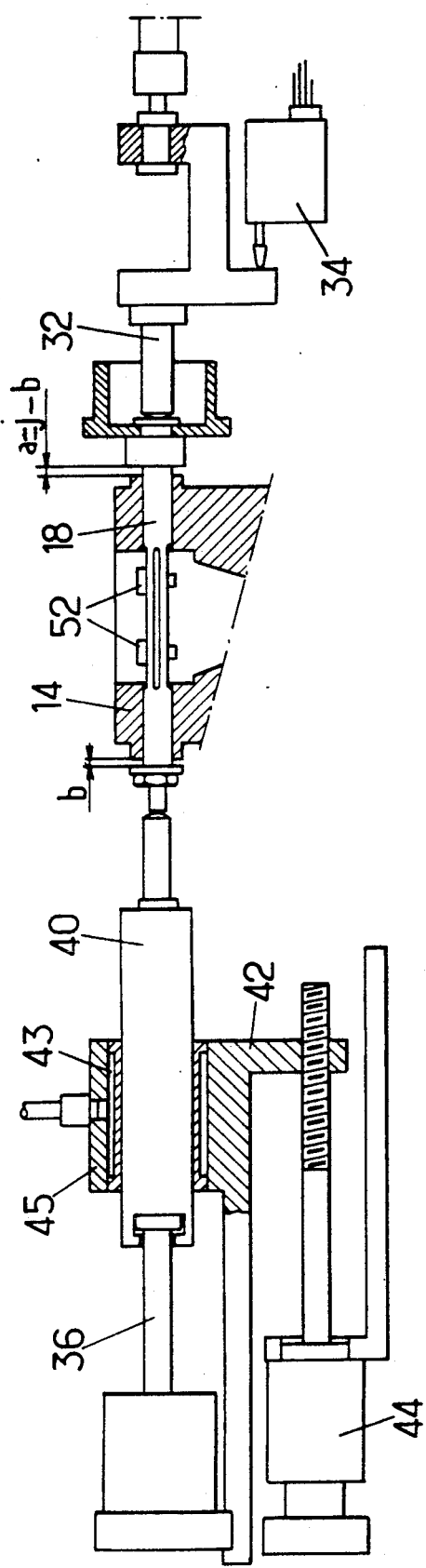

METHOD AND DEVICE FOR FITTING A ROTARY THROTTLE UNIT IN A PIPE

BACKGROUND OF THE INVENTION

The invention relates to a method and a device for fitting a rotary throttling unit in the passage defined by a pipe, said unit comprising a shaft which passes through the pipe and a butterfly valve having a shape corresponding to that of the pipe, inserted in a radial slit of the shaft and fastened thereto, for example by squeezing the slit.

The invention is particularly, although not exclusively, applicable to the fitting of a rotary airflow throttling unit in a butterfly valve body for adjusting the airflow in injection feed systems for internal combustion engines and in carburettors.

Assembling methods are already known including the steps of inserting the shaft accross the pipe and providing it with elements which define its axial free movement; the butterfly valve is then introduced into the slit and the shaft is brought into the angular position in which the butterfly valve closes the passage of the pipe before the butterfly valve is secured to the shaft. A method for carrying out these operations automatically is described in French patent publication No. 2 642 498.

The slit has an axial length slightly greater than the width of the butterfly valve, so that the shaft may be adjusted axially with respect to the butterfly valve. When the latter is in closed position, it is fixed with respect to the pipe. The shaft may then be moved between a first and a second stop position defined by abutment of the elements which it carries. To reduce the friction, none of these elements must bear on the pipe during normal operation. To obtain this result, while the amount of free movement between the two abutting positions is generally only a few tenths of a mm, attempt is made to balance the clearances which exist between the pipe and the elements coming into abutment before the butterfly valve is secured to the shaft. At the present time, this operation is carried out by assessing the clearances visually. This method is difficult and does not allow the desired degree of reliability and accuracy to be obtained.

SUMMARY OF THE INVENTION

An object of the invention is to provide an improved method and device for fitting a rotary unit. It is a more specific object to achieve accurate and reliable balancing of the clearances automatically, by using only relatively simple means.

To this end, there is provided an assembling method of the above-defined type, wherein:
the shaft is successively brought into its two abutment positions for detecting these positions,
the amount of axial clearance is derived therefrom,
the shaft is moved automatically, from one of its abutment positions, by a distance substantially equal to half of said amount of axial clearance, and the butterfly valve is fixed on the shaft.

The invention also provides a device for implementing the above method, comprising a frame receiving the pipe and its rotary unit, further comprising:
first means for moving said shaft in a first direction, as far as the first abutment position,
second means for moving said shaft, in the opposite direction, as far as the second abutment positions,
means for detecting said abutment positions,
means for computing the distance between the abutment positions and for controlling the first or second means for moving the shaft, from the first or second abutment position, by a distance equal to a predetermined fraction of said distance.

The invention will be better understood from the following description of a particular embodiment, given by way of example.

BRIEF DESCRIPTION OF THE INVENTION

FIG. 1 shows a device for implementing the invention, in the condition in which the shaft has been brought into a first abutment position, FIG. 2, similar to FIG. 1, shows the shaft brought to its second abutment position, FIG. 3 shows the device in the position in which it is when it has brought the shaft into the position where the clearances are balanced.

DETAILED DESCRIPTION OF A PREFERRED EMBODIMENT

The device shown in FIGS. 1 to 3 can be used for fitting and adjusting a rotary unit in a butterfly valve body for a fuel injection system. The butterfly body comprises a casting forming a pipe 10 in which a passage 12 is provided. Two mutually aligned bearing passages are formed across the wall of the pipe and a shaft 18 is rotatably secured whithin the passages via bearings (not shown). The shaft belongs to a rotary unit also comprising a throttle or butterfly valve 22 of disk shape. This valve is inserted in a radial slit in the shaft, sufficiently long for the butterfly valve to be adjustable in the axial direction. Holes 20 are formed across the shaft for receiving screws for fastening the shaft to the butterfly valve, in which an elongate hole is formed for passing the screws. The butterfly valve has a size such that, when brought into the position shown in FIG. 1, it closes passage 12.

The assembling method of the invention comprises preliminary steps, known per se, consisting in inserting shaft 18 through the pipe 10 and providing the shaft with elements which limit its amount of free movement in the axial direction, sliding the butterfly valve 22 into the slit, then rotating the shaft to the position in which the butterfly valve closes passage 12. Such operations may be carried out manually or by the method described in French publication No. 2,642,498 already mentioned. As illustrated in FIG. 1, the elements which limit the free axial movement of the shaft comprise a part 24 for rotating the shaft, and a clamping nut 25 fixed to a threaded end portion, on the other side of the shaft.

The unit in that condition is placed on the frame 26 of the device for adjusting the axial position of the shaft, before the butterfly valve is secured on the shaft. Frame 26 may have a recess for receiving the pipe and retaining the latter in a well-defined position and orientation.

The components of the device carried by the frame 26 comprise first means for pushing the shaft axially in a first direction (leftwards in FIG. 1) until it reaches a first axial abutment position. As illustrated, the first means may comprise a hydraulic, pneumatic or electric double-action thruster 28 whose movable plunger 30 moves parallel to the axis of rotation of shaft 18 and is provided with a push rod 32 bearing on the right hand end of the shaft. The push rod cooperates with the feeler of a position sensor 34 which forms means for detecting the abutment positions. The sensor is constructed so that its feeler is resiliently retained in contact with the push rod.

Second means for moving shaft 18 in an opposite direction comprise a counter-thruster 36 aligned with thruster 28 and having a plunger 38 is coupled to a second push rod 40 arranged to bear against the left hand end of shaft 18. This counter thruster 36 is dimensioned to exert a force greater than that of thruster 28. The body of the counter-thruster 36 is not fixed directly to the stationary frame 26. It is fixed to a carriage 42 which can be moved by an electric motor 44 parallel to the shaft. The electric motor is of a type which may be controlled accurately (step-by-step motor or servo-controlled motor for example). Motor 44 may for instance drive carriage 42 via a screw-nut connection. Sliding guides (not shown) may typically be provided for guiding the carriage on the frame.

Push rod 40 is movable longitudinally in a sheath 45 belonging to carriage 42. A brake 43, formed for example by an inflatable sleeve, such as a pneumatic sleeve is located inside the sheath. The push rod 40 is immobilized with respect to the carriage or released depending on whether the sleeve is fed or not with pressurized fluid.

The device further comprises a computing and control box 46 whose functions will be described in detail further on; such means include a processor which receives the measurement signals delivered by sensor 34 and they control a bank of electrically controlled or solenoid valves 48 feeding the double action thrusters 28 and 36 (when the thrusters operate with fluid pressure), an electric supply 50 for controlling motor 44 and means 51 (such as a solenoid valve) for energizing the brake 43.

The method of balancing the axial clearances of shaft 18 is then as follows, when the device which has just been described is used. The required successive operations are controlled by box 46, in accordance with a stored program, after pipe 10, equipped with shaft 18 and butterfly valve 22 oriented in the closed position, has been placed on frame 26 while push rods 32 and 40 are retracted.

Thruster 28 is actuated by circuit 46 until push rod 32 brings shaft 18 into the abutment position where it is shown in FIG. 1: a clearance j then exists on the left-hand side of the shaft. When the feeler stops, an output signal indicating the position of the feeler is delivered by sensor 34, which may be of analog or digital type, and is stored in the memory of the computing and control box 46.

The counter-thruster 36 is then actuated by box 46, brake 43 is de-energized and thruster 28 remains actuated. Push rod 40 then moves shaft 18 until it is in abutment on the left-hand side of pipe 10 (FIG. 2). When the movement of push rod 40 ceases, box 46 stores the position signal delivered by sensor 34.

The processor of computing and control box 46 may then, by subtraction, calculate the clearance j. It then moves shaft 18 leftwards by a predetermined fraction of clearance j: This fraction will generally be ½.

For that purpose, with the device as illustrated, it is sufficient to maintain thrusters 28 and 36 in energized condition, to energize brake 43 and to move carriage 42 leftwards by means of motor 44, over the distance corresponding to clearance b which will be created at the left: the shaft follows push rod 40, since it is subjected to the action of push rod 32, the residual clearance a on the right side being then equal to j-b.

With the device in this condition, the butterfly valve 22 is immobilized on shaft 18, for example by means of screws 52 passing through the holes 20 which are smooth on one side of the butterfly valve, and threaded on the other side.

Once this operation is finished, brake 43 may be released and thrusters 28 and 36, as well as motor 44, may be brought back to their original positions.

Numerous modifications of the invention are possible. Two sensors may be provided instead of a single sensor 34. The thrusters 28 and 36 may be combined in a single unit, placed on one side of the shaft, by providing the single push rod with means for temporary and bidirectional connection with shaft 18. The means for moving shaft 18 over distance b may be integrated in the counter-thruster 36. It should be understood that the scope of the invention extends to such modification, as well more generally as to all others remaining within the scope of equivalents.

We claim:

1. A method for fitting and adjusting a rotary throttling unit in a pipe formed with a passage, said unit having a shaft for rotatably passing through said pipe and a butterfly valve insertable in an axial slit of said shaft and sized for closing said passage, comprising the steps of:

inserting said shaft across said pipe, transversely to said passage, providing said shaft with abutting elements limiting the amount of axial free movement of said shaft with respect to said pipe to a predetermined range;

introducing said butterfly valve into said slit of said shaft, inside said passage;

rotating said shaft into an angular position in which said butterfly valve closes said passage;

forcing said shaft axially to move it into a first direction until it reaches a first abutment position and measuring said first abutment position;

forcing said shaft axially to move it into a second direction opposite to said first direction until it reaches a second abutment position and measuring said second abutment position;

deriving the size of said range from said measurements of said abutting positions;

forcing said shaft axially to move it, from one of its said abutment positions, by a distance equal to a predetermined fraction of said range; and securing said butterfly valve on said shaft once said shaft's desired position has been determined within said pipe.

2. A device for fitting and adjusting a rotary throttling unit, in a' pipe formed with a passage, said unit having a shaft passing through said pipe and a butterfly valve inserted in an axial slit of said shaft and sized for throttling said passage, comprising:

frame means for receiving said pipe;

first means carried by said frame means for forcibly moving said shaft in a first axial direction up to a first abutment position;

second means carried by said frame means for forcibly moving said shaft axially, in a second direction opposite to said first direction, until it reaches a second abutment position;

detection means for detecting said first and second abutment positions and for delivering corresponding signals;

controlling and computing means for receiving said corresponding signals and for computing a range between said first and second abutment positions and for actuating one of said first and second means for forcibly moving said shaft, from one of said first and second abutment positions, by a distance equal to a predetermined fraction of said range and securing said butterfly valve on said shaft once said shaft's desired position has been determined within said pipe.

3. Device according to claim 2, wherein said first means comprise a thruster having a first push rod for abutting an end of said shaft and exerting a force biassing said shaft in said first direction and said second means comprising a counter-thruster sized to exert a force higher than that of said first thruster and having a second push rod for abutment against an opposite end of said shaft and exerting a force biassing said shaft in said second direction.

4. Device according to claim 3, wherein said detection means include at least one sensor for measuring the at least one of said first push rod and second push rod.

5. Device according to claim 3, wherein said second means further comprise a carriage and means energizable for fastening a movable element of said counter-thruster and axially movable by a predetermined and adjustable distance with respect to said frame means.

6. Device according to claim 5, wherein said carriage is provided with an electric motor for controlling the movement of said carriage with respect to said frame means by said predetermined distance.

7. Device according to claim 5, wherein a housing of said counter-thruster is secured to said carriage and a brake for optionally securing said movable element of said counter-thruster is provided on said carriage.

8. Device according to claim 3, wherein said controlling and computing means further comprise means for actuating said thruster and counter-thruster according to a stored predetermined sequence.

9. Device according to claim 6, wherein said controlling and computing means further comprise means for actuating said thruster and counter-thruster and actuating said electric motor of said carriage according to a stored predetermined sequence.

* * * * *